United States Patent [19]

Rodriguez

[11] Patent Number: 4,687,670
[45] Date of Patent: Aug. 18, 1987

[54] TAMALE MAKING METHOD

[76] Inventor: John G. Rodriguez, 65 W. Mill St., Porterville, Calif. 93258

[21] Appl. No.: 816,444

[22] Filed: Jan. 6, 1986

[51] Int. Cl.$^4$ ............................ A23P 1/00; A21C 9/06
[52] U.S. Cl. .................................... 426/297; 99/450.6; 426/94; 426/283
[58] Field of Search ................. 426/297, 282, 283, 92, 426/94; 99/450.6, 450.7

[56] References Cited

U.S. PATENT DOCUMENTS 2,411,857  12/1946  Harriss ............................... 426/282
3,649,303  3/1972  Hayhurst et al. ................... 426/283

Primary Examiner—George Yeung
Attorney, Agent, or Firm—Harvey B. Jacobson

[57] ABSTRACT

A support panel is provided including a smooth upper surface and an upstanding abutment or bar extending along one margin of the panel. An open frame is pivotally supported from the upper surface of the panel adjacent the bar and is swingable between a closed position closely overlying the upper surface and a raised position extending upwardly from the upper surface, swung past a center vertical position and inclined against the bar. First and second superposed lower and upper sheets may be clamped between the frame and the panel upper surface when the frame is in the closed position and the inner periphery of the frame may be used to define predetermined boundaries of layers and areas of food materials to be placed upon the upper sheet prior to swinging of the frame to an open position and rolling the food materials in the upper sheet and thereafter wrapping the rolled upper sheet and food materials in the lower sheet.

4 Claims, 4 Drawing Figures

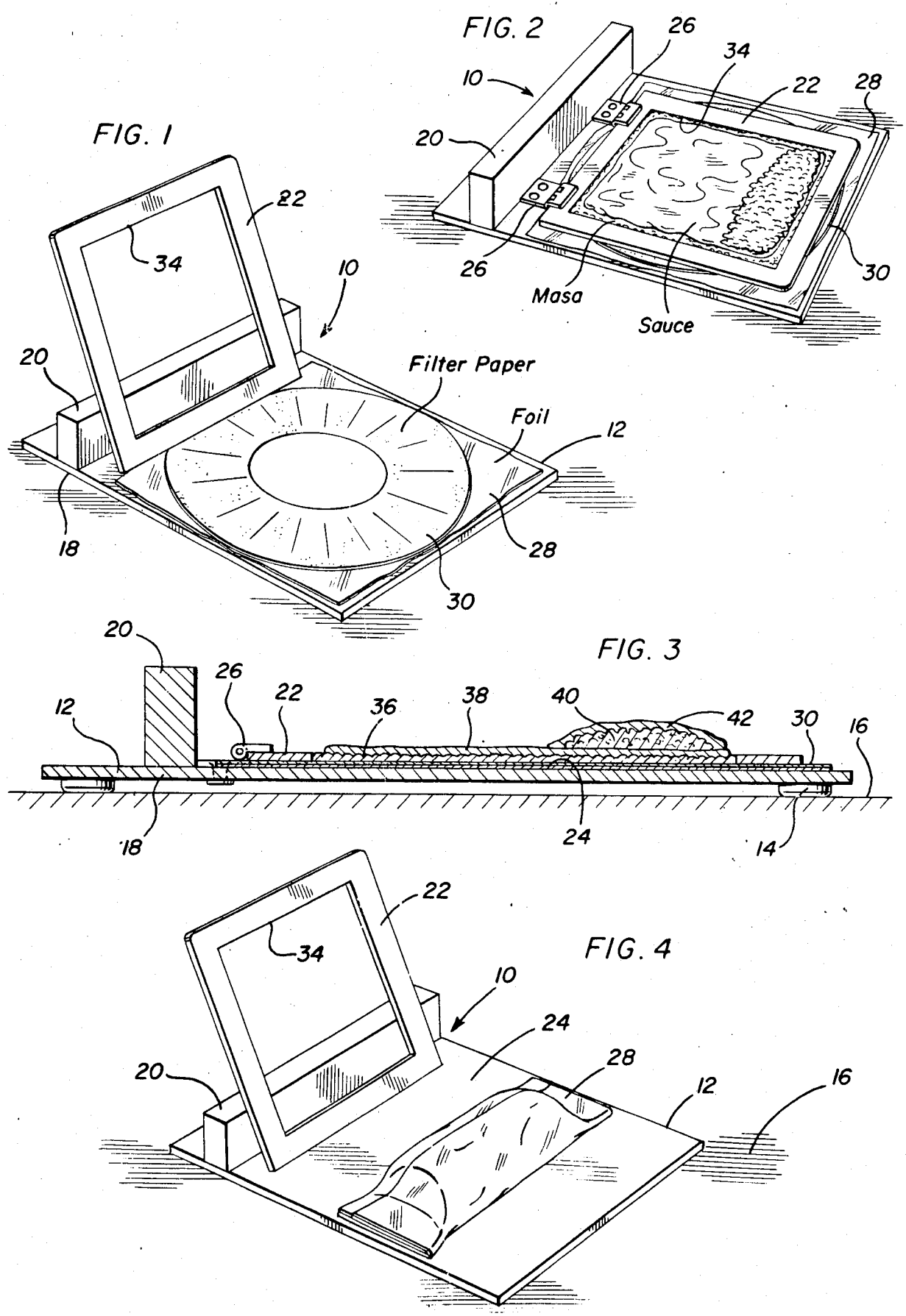

TAMALE MAKING METHOD

BACKGROUND OF THE INVENTION

1. Field of the Invention

This invention relates to an apparatus for supporting first and second superposed flexible sheets from a horizontal upwardly facing support surface with the sheets clamped to the surface against shifting relative to each other in order that a stiff fluent food material may be spread over the uppermost sheet without either sheet shifting relative to the support surface.

2. Description of Related Art

Various forms of tamale making devices heretofore have been provided as well as food material confining devices which could be used in the preparation of a tamale before cooking and/or freezing.

Examples of these previously known structures are disclosed in U.S. Pat. Nos. 2,386,993, 2,411,857, 3,649,303, 3,667,971, 4,207,046, 4,498,377 and 4,516,923.

However, these previously known structures are not specifically designed to perform the desirable functions accomplished by the instant invention.

SUMMARY OF THE INVENTION

The tamale making apparatus of the instant invention includes a base defining a horizontal upper surface and an open frame is pivotly mounted from the base for movement between a closed position closely overlying the upper surface of the base and an open position swung upwardly away from the upper surface of the base. When the frame is in the closed position it functions to clampingly engage two thin flexible sheets between the frame and the base upper surface in a manner such that a stiff fluent food material may be spread over the upper flexible sheet without either of the sheets being displaced laterally relative to the upper surface of the base. Further, the open frame is of a configuration such that the inner periphery thereof defines the outer boundary of the area of the upper sheet over which the stiff fluent food material is to be spread, the outer marginal portions of the two flexible sheets being disposed outwardly of all peripheral portions of the aforementioned boundary. After a single or multiple layers of food have been placed upon the upper sheet, the frame is raised to the open position and the upper sheet may be rolled about the food material disposed thereon and the lower sheet subsequently may be used to wrap the bundle formed by the upper sheet being rolled about the food material placed thereon.

The main object of this invention is to provide a support upon which superposed upper and lower flexible sheets may be stationarily supported in order that a stiff fluent food material may be spread over the upper sheet throughout a predetermined area thereof.

Another object of this invention is to provide a support including hold down means for the upper and lower sheets in a form defining the outer boundaries of a predetermined area of the upper sheet throughout which the stiff fluent food material is to be spread thereover.

Still another important object of this invention is to provide an apparatus in accordance with the preceding objects and which also will enable the upper sheet to be rolled about the food material disposed thereon without interference with the sheet hold down means.

Yet another important object of this invention is to provide a method of preparing a tamale prior to cooking or freezing in a quick, precise and convenient manner.

A final object of this invention to be specifically enumerated herein is to provide a tamale making apparatus in accordance with the preceding objects and which will conform to conventional forms of manufacture, be of simple construction and easy to use so as to provide a device that will be economically feasible, longlasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the tamale making apparatus of the instant invention with the hold down frame thereof in an open position;

FIG. 2 is a perspective view of the tamale making apparatus with the hold down frame in a closed position and the tamale ingredients spread over the upper sheet of the two flexible sheets held down by the hold down frame;

FIG. 3 is an enlarged central vertical sectional view of the apparatus illustrated in FIG. 2;

FIG. 4 is a perspective view of the tamale making apparatus with the hold down frame thereof in an open position and the formed tamale in a wrapped condition.

DESCRIPTION OF THE PREFERRED EMBODIMENTS

Referring now more specifically to the drawings the numeral 10 generally designates the tamale forming apparatus of the instant invention. The apparatus 10 includes a base plate 12 which is generally rectangular in planned shape and includes four slightly depending corner feet supported therefrom for supporting the base plate 12 in space relation relative to a supporting table or counter 16. The rear marginal portion 18 of the base plate 12 has an outstanding abutment fence or bar 20 secured thereto in any convenient manner and that portion of the base plate 12 disposed forward of the fence or bar 20 is generally square in planned shape.

A generally square, continuous periphery and open frame 22 is pivotally supported from the upper work surface 24 of the base plate 12 through the utilization of a pair of hinge assemblies 26 and the hinge assemblies 26 pivotally support the frame 22 from the base plate 12 for swinging movement between a closed position illustrated in FIGS. 2 and 3 of the drawings closely overlying the upper work surface 24 of the base plate 12 and an open position illustrated in FIGS. 1 and 4 with the frame 22 swung past a substantially vertical position and leaning against the abutment fence or bar 20.

When it is desired to make a tamale using the apparatus 10, the frame 22 initially is placed in the open position thereof illustrated in FIGS. 1 and 4 and first and second superposed flexible sheets 28 and 30 are placed upon the work surface 24 in generally centered position relative to that portion of the work surface 24 disposed forward of the bar 20. The sheet 28 comprises a foil or foil faced sheet and the sheet 30 comprises a sheet of material similar to filter paper. After the sheets 28 and 30 have been placed upon the work surface 24, the frame 22 is swung downwardly from the open position thereof illustrated in FIG. 1 to the closed position thereof illustrated in FIGS. 2 and 3. Thereafter, one forward corner of the frame 22 may be held down by one hand of the user of the apparatus 22 in order to tightly clamp the sheets 28 and 30 between the underside of the frame 22 and the work surface 24 of the base plate 12 in order to prevent either the sheet 28 or the sheet 30 from shifting relative to the work surface 24.

Then, with downward pressure maintained on the forward portion of the frame 22, a quantity of masa 36 is spread over the sheet 30 within the confines of the inner periphery 34 of the frame 22. Thereafter, a layer 38 of chili sauce is spread over the layer of masa and a quantity 40 of tamale core food mixture is disposed over the layer 38 immediately inward of the forward marginal portion of the frame 22 and yet another layer 42 of chili sauce is placed over the tamale core food mixture quantity 40. The layers 36 and 38 are confined to the area of the sheet 30 within the boundary defined by the inner periphery 34 of the frame 22, the quantity 40 is confined to the forward portion of the area immediately rearward of the 40 marginal portion of the frame 22 and the layer 42 is confined, substantially, to the area of the quantity 40.

Thereafter, the frame 22 is raised to the open position thereof illustrated in FIG. 4 and the sheet 30 is rolled from front to rear over and about the layers 36 and 38, the quantity 40 and the layer 42. Thereafter, the rolled tamale within the filter paper sheet 30 is wrapped within the foil or foil faced sheet 28 in the manner illustrated in FIG. 4 and the ends of the resultant package then may be folded over the adjacent portions of the package. The tamale may then be cooked within the foil or foil faced sheet 28 or frozen prior to cooking at some future date.

Assuming substantially constant thickness of the layers 36 and 38 and a substantially constant quantity 40, tamales formed through utilization of the apparatus 10 will be reasonably uniform in size, shape and weight and the production of foil or foil faced wrapped tamales may be accomplished at a rapid rate and with considerable ease over conventional tamale forming methods.

The frame 22 comprises a dual function apparatus and enables the sheets 28 and 30 to be clamped in position while the layers 36 and 38 are being spread over the sheet 30 and the layer 36 respectively. In addition, the frame 22 clearly defines the desired boundaries of the layers 36 and 38 and also the positioning of the quantity 40 and the layer 42 thereover. With such controls the tamales being formed are consistent in size, shape and weight and close control of the amount of materials used in forming the layers 36, 38 and 42 as well as the quantity 40 may be experienced.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as now is as follows:

1. The method of preparing a tamale prior to cooking or freezing, said method comprising the steps of:
    A. placing a first protective heat resistant and flexible sheet over a flat horizontal and upwardly facing food preparation surface,
    B. placing a second flexible food preparation shape retaining and confining sheet over said first sheet in generally centered registry therewith and with said sheets including corresponding first margins and corresponding second margins opposite said first margins,
    C. placing an open frame having a generally planar first side over said second sheet in generally centered registry with said second sheet and with said sheets including corresponding marginal portions clamped between said first side and said surface.
    D. spreading a layer of uncooked masa over said second sheet throughout substantially the entire plan area thereof disposed within the boundaries of the inner periphery of said frame,
    E. spreading a sauce layer over the masa layer,
    F. spreading a quantity of tamale core food mixture over that portion of the sauce layer inward of and adjacent the inner marginal portion of said frame corresponding to said first margins of said sheets,
    G. removing said frame,
    H. rolling said second sheet, mesa layer, sauce layer and said core food mixture from said first margin of said second sheet toward said opposite margin of said second sheet in order to form a food mixture roll, and
    I. wrapping the second sheet and food mixture roll formed in step H in said first sheet.

2. The method of claim 1 including:
    J. adding an additional sauce layer over said food mixture quantity between steps F and G, 3. The method of claim 1 including folding the roll ends of said second sheet over the opposite ends of the roll formed during step H prior to performing step I.

4. The method of claim 1 wherein the inner periphery of said frame is used to define the periphery of the layers formed during steps D and E.

* * * * *